United States Patent Office 3,184,494
Patented May 18, 1965

3,184,494
PROCESS FOR PRODUCING ORGANIC ISOCYANATES
Shozo Maeda, Nishinomiya-shi, Katsundo Yamori, Niihama-shi, and Hiroshi Kaminaka, Yao-shi, Japan, assignors to Sumitomo Chemical Company, Ltd., Higashi-ku, Osaka, Japan, a corporation of Japan
No Drawing. Filed Jan. 22, 1962, Ser. No. 167,945
Claims priority, application Japan, Feb. 1, 1961, 36/3,196
4 Claims. (Cl. 260—453)

This invention relates to the process for the production of organic isocyanates. More particularly, it relates to the improvement in or relating to the process for the production of organic isocyanates.

In recent days, various organic isocyanate compounds are highlighted as starting materials for novel types of synthetic resins and synthetic fibers. Further, they are found to be valuable intermediates used for the production of medicines, agricultural chemicals, dyes, textile-treating chemicals, etc.

The production of the organic isocyanate compounds through the reaction of a primary amine or its salt with phosgene has been well known and employed, and a number of patents have been issued with respect to such method.

However, almost all of the methods heretofore proposed give the objective product merely in a yield of as low as 90% or below. Or, they have such a disadvantage as by-producing a considerable amount of tarry products in the isolation process of the isocyanate from the reaction product, for example, by distillation.

More concretely speaking, a mode of reaction was employed in most of the prior arts, in which a solution of a primary amine in an inactive solvent was reacted with liquid phosgene or a solution of phosgene in an inactive solvent at a low temperature below 30° or 40° C. to convert a part of the amino groups into the form of carbamyl chloride or amine hydrochloride, then the resulting reaction mixture was heated to a temperature of 90° to 130° C. to convert the carbamyl chloride into the isocyanate, and subsequently phosgene was blown into the said reaction mixture, with raising the temperature to 150° to 160° C., to convert the unreacted amine hydrochloride into the isocyanate. Various proposals have been made in this reaction with respect to the variation of the molar ratio of the amine to phosgene, the use of certain catalysts and the selection of way of reaction, e.g., vessel, pipe, or column type. The reaction which takes place in such methods may be shown by the following chemical formulas:

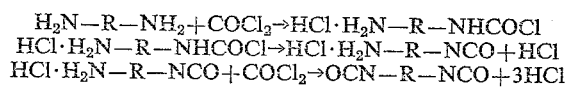

wherein R represents a bi-valent hydrocarbon residue.

In such prior methods which involve the reaction of amine hydrochloride with phosgene, the formation of carbamyl chloride is effected at a relatively slow velocity. If both of the reactants are directly reacted at about 160° C., the isocyanate yield obtained is as low as about 70%. Because of this slow reaction velocity, a longer period of heating is necessitated, which would undesirably cause the interaction of the once formed isocyanate groups with one another, thereby having the yield decreased. Especially, amine rapidly reacts with the resulting isocyanate to form a urea linkage. In the case where polyamine and polyisocyanate are concerned, accordingly, resinous products which are difficultly treated are formed as the result of the polymerization reaction. These side reactions which undesirably occur may be one of the most remarkable causes of decreasing yield and of forming tarry substances as by-product.

It is known that carbamyl chloride starts to decompose upon heating, and is completely converted into isocyanate at temperature above 90° C. At a lower temperature, however, carbamyl chloride does not react substantially with amine, so it might be preferable to effect by some way the conversion of all of the amine groups into the carbamyl chloride, which is then decomposed to the isocyanate, thereby minimizing the chance of the reaction of the isocyanate group with other compounds. Since the decomposition of carbamyl chloride is relatively manageable, there is no need to expose the said chloride to the high temperature for a long time, so that almost all of the side reactions could be prevented, and an improved yield of isocyanate and a reduced amount of by-production of tarry substances could be obtained.

It is, accordingly, one object of the present invention to provide an improved process for the production of organic isocyanates, which process is entirely free from the disadvantages encountered in the prior arts, namely with higher yield and lower tarry by-products.

Still other objects, capabilities and advantages comprehended by the present invention will be apparent from the description and claims which follow.

The present invention is based upon an original idea residing in the conversion of the amine groups into the carbamyl chloride as completely as possible and the subsequent conversion of the resulting carbamyl chloride into the isocyanate.

In accordance with the present invention, thus, a process for producing organic isocyanates is provided, which comprises a step of mixing a solution of a primary amine in an inert solvent with phosgene in an amount of at least the stoichiometric amount and less than 2 times the stoichiometric amount, based upon the amount of the amine, nearly at below room temperature; a step of introducing phosgene into the resulting reaction mixture at a temperature of 60° to 80° C., until the mixture is changed from the viscous slurry to a light fluid suspension, thereby to convert the amino groups to the carbamyl chloride substantially completely; and a step of heating the suspension at a higher temperature to cause the decomposition of the carbamyl chloride to the isocyanate.

Now the present invention will be described in due order of the steps as follows.

In the first step of the process of the invention, a suitable amount of liquid phosgene or of a solution of phosgene in an inert solvent is reacted with a solution of an amine in an inert solvent, while being cooled, at below room temperature. In this stage, a part of the amino groups is converted into the carbamyl chloride and the other part converted into the hydrochloric acid salt, thus a somewhat viscous slurry being obtained as the reaction mixture. The amount of phosgene used in this stage may preferably be from the stoichiometric amount to less than 2 times the stoichiometric amount of the amine. If phosgene is used in an amount of less than the stoichiometric amount, much amount of the amine and the amine hydrochloride remain unreacted, both of which adversely affect the subsequent reaction. If phosgene is used in an amount of more than 2 times the stoichiometric amount, a part of the phosgene will be dissipated through vaporization in vain.

Phosgene may be used either in the form of liquid or in solution. When a such solvent as listed below is used, phosgene which is dangerous can advantageously be handled with safety, since such solvents have considerably greater solubility to phosgene even at room temperature. In addition, there are other advantages in use of solvent, because it reduces the cooling capacity and facilitates the temperature control in the first step, which is an exothermic reaction and in which the amine solution to be added is oftentimes kept at a temperature higher than 50° C. to prevent the isolation of the crystals of the amine.

The period of time required for the first step varies depending upon the cooling capacity to keep the reaction mixture at below room temperature while the reactants are mixed together, as well as the other reaction conditions, but it is ordinarily from about 10 to 60 minutes. After the mixing is finished, the mixture is subjected to the subsequent step.

Now the second step will be mentioned below, which is a characteristic step in the present method. Into the reaction product of the first step which is in slurry state, gaseous phosgene is blown, while being kept at 60° to 80° C. According to the advance of the reaction, the unreacted amine and the amine hydrochloride are converted substantially completely into the carbamyl chloride, whereby change of the viscous slurry to a light fluid suspension being observed. It is quite surprising that almost all of the amine groups are converted in the second step into the carbamyl chloride with little side-reactions and with a practical reaction velocity, by blowing phosgene into the reaction mixture while being kept at a temperature of 60° to 80° C., which temperature is thought to be higher than the starting temperature of decomposition of carbamyl chloride.

The similar reaction would be effected at a temperature lower than 60° C., but it needs uneconomically a considerably longer period of time for completion of the reaction. While, at a temperature higher than 80° C., the reaction appears to be advantageously accelerated, but the side reactions including the premature decomposition of the carbamyl chloride takes place in advance of the finish of the whole conversion of the amine into the carbaminyl chloride, thereby causing precipitation of solid by-products and decreasing the yield of the desired isocyanate.

The amount of phosgene used and the reaction period of time in this step may vary depending upon the nature of the reaction product of the first stage and the type of amine used. Usually, phosgene is blown in an amount of about 0.5 to 3.5 times as compared with its stoichiometric amount over a period of more than 4 hours, preferably 4 to 8 hours, with successful result.

In this step, hydrogen chloride, if present in the dissolved form, would depress the reactivity of phosgene and prevent the further proceeding of the reaction. In this process, however, it is observed that the reaction can be promoted, since the phosgene blown into the reaction system may carry the hydrogen chloride off from the said system.

In the third step of the process of the invention, the temperature is raised from 80° C. to about 130° C. The liquid reaction mixture becomes clear with vigorous evolution of hydrogen chloride, and, at least, a clear, reddish brown liquid is obtained. In this step, it will be sufficient to maintain this liquid at a temperature of 130° to 160° C., preferably 140° to 150° C., for about 15 to 60 minutes. The heating at a higher temperature for a longer period of time would increase the by-production of tarry products. This means that the reactants and the product are exposed to the higher temperature merely for a shorter period of time in the present method, as compared with the case of the prior methods. This is another reason of the increased yield and the reduced amount of tarry by-products of the present method. If desired, phosgene may be blown into the reaction mass in the third step to accelerate the reaction and to ensure the completion of the reaction, but it is not essential.

To the reaction mass thus obtained, dried nitrogen or carbon dioxide gas is blown to remove the remaining hydrogen chloride and unreacted phosgene. Thus, a crude reaction liquid can be obtained. By determining the amount of isocyanate contained in the reaction liquid, it is found that 94 to 98% of the starting amine is converted to the isocyanate. These results are superior to that of the conventional processes of 80 to 90% in yield. The purified isocyanate can be isolated from the reaction liquid as by distillation or rectification, the yield in the purification step being 95 to 97%.

According to the process of the present invention, the yield is increased and the by-production of tarry products is minimized because of the shorter heating time, namely, the amount of the tarry products is a half to a third, as compared with that in the known processes. This means reduction in the purification loss and in the required time for the treatment.

Tertiary amines such as dimethylaniline or metal halides such as anhydrous cobalt chloride employed in a catalytic amount, would serve for shortening of the required time for the reaction, but the increase of the yield cannot be expected. Contrarily, there will be raised a drawback to need an additional step of removing the catalyst.

There might be a question at first sight of the invention that it would be much better to start the first step of the reaction at a temperature of 60° to 80° C. However, it should be noted that such method gives a larger amount of tarry products and a lower yield of isocyanate than in the present method, because the temperature control is difficult at the start of the reaction at such temperature and the carbamyl chloride once formed tends to be decomposed by a local superheating, due to the exothermic reaction of the amine and phosgene.

The concentration of the amine in the inert solvent, employed in the invention, is preferably 5 to 20%. At a higher concentration, the slurry in the first step becomes too viscous to be handled, whereas, at a lower concentration, much amount of the solvent is needed uneconomically. Therefore, the concentration of 6 to 12% is the most practical.

Inert solvents used herein should readily dissolve the amine, isocyanate and phosgene, but poorly dissolve hydrogen chloride, and further it should be free from active hydrogen capable of reacting with the isocyanate, and easily available commercially. Typical inert solvents are toluene, xylene, monochlorobenzene, o-dichlorobenzene, p-dichlorobenzene, trichlorobenzene, etc. Considering the availability, the temperature used, and the degree of solubility, dichlorobenzenes are the most suitable solvents.

The amines used can be selected so as to give desired isocyanates through the reaction with phosgene, and they may be aromatic amines, such as toluidines, 2,4-tolylenediamine, 2,6-tolylenediamine, 4,4'-diaminodiphenylmethane, benzidine, 1,5-naphthylenediamine, etc. and aliphatic amines, such as octadecylamine.

The present invention may be carried out either in a batch process which comprises reacting phosgene with an amine at room temperature in a single reactor vessel and then raising the temperature stepwise, or otherwise in a continuous process which comprises effecting the first step reaction in the first reactor, overflowing the reaction mass to the second reactor maintained at 60° to 80° C. with blowing phosgene thereinto and finally overflowing the reaction mass to the third reactor maintained at 130° to 160° C. to effect the decomposition.

Now the present invention will be illustrated in more detail with reference to the following examples, without limiting the scope of the invention. All parts and percentages in the examples are by weight unless otherwise identified.

*Example 1*

Into a reactor equipped with an efficient agitator, a jacketed dropping funnel and a condenser, a solution consisting of 130 parts of phosgene and 260 parts of dichlorobenzene is charged. A solution of 42.7 parts of tolylenediamine (a mixture of about 80% of 2,4-tolylenediamine and about 20% of 2,6-tolylenediamine) and 230 parts of dichlorobenzene is added dropwise thereto, with being agitated, during 30 minutes to obtain a brown-purple, somewhat viscous slurry. The content of the reactor is maintained at 30° to 40° C. by cooling during the reaction.

Then, phosgene gas is blown into the reaction mixture for four to six hours, while keeping the temperature of the mixture at 60° to 80° C., whereby the viscous slurry is gradually changed to a fluid state and turned finally to a light fluid suspension. After well finishing the reaction, the temperature is raised. The decomposition of carbamyl chloride with vigorous generation of hydrogen chloride gas is observed, as temperature reaches from 90° to 130° C. After maintaining the reaction mixture at 150° to 160° C. for 30 minutes, a reddish brown, clear liquid is obtained. Into this liquid, dried nitrogen gas is blown at a temperature of 130° to 160° C., thereby removing unreacted phosgene and hydrogen chloride. The analysis of the reaction mass shows the presence of 58.5 parts of tolylene di-isocyanate. It means that 96% of the amine used is entered to the reaction. By rectification of the crude reaction mass, 56.7 parts of the purified isocyanate is obtained. The yield of the rectification is 97%, and the total yield based upon the starting amine is 93.1%. In this rectification, 2.5 parts of tarry products is also by-produced.

Using the same equipment and the same amount of the raw materials as used in the present invention, a control experiment is carried out.

The amine solution is added to the phosgene solution at 30° to 40° C. Then, phosgene is blown therein at 70° C. for 2 hours. While the reaction mass still remains viscous, the temperature is raised up to 160° C. By blowing phosgene therein, the reaction is completed, after 4 hours, whereby a dark-brown liquid is obtained. Dried nitrogen gas is blown thereinto. It is found that 90% of the starting amine is entered to the reaction. A rectification yields 49.3 parts of tolylene diisocyanate. The yield of the rectification is 90%, and the total yield 81.0%. Also 8 parts of tarry products is recovered as by-product.

*Example 2*

To a reactor maintained at about 30° C., a solution of 61 parts of tolylenediamine in 249 parts of dichlorobenzene is charged from one inlet, and a solution of 150 parts of phosgene and 300 parts of dichlorobenzene charged from the other inlet, and both are well reacted together. Just after the completion of the charge of the solutions, the temperature is raised up to a temperature of 60° to 80° C., and phosgene is blown thereinto for 4 to 5 hours to make the reaction mass a fluid suspension. After maintaining it at 160° C. over 30 minutes, a red-brown, clear liquid is obtained. The analysis shows that 94% of the starting amine is converted to the corresponding isocyanate. Finally, 78.5 parts of tolylene diisocyanate is obtained in the distillation yield of 97%. The total yield is 91.2%.

*Example 3*

A solution of tolylenediamine in dichlorobenzene (12:130, by weight) and a solution of phosgene and dichlorobenzene (1:2, by weight) are prepared. Into the first reactor maintained at 30° C., the amine solution is charged at the rate of 142 parts per hour and the phosgene solution is charged at the rate of 90 parts per hour, to make the both react together. The reaction product is overflown through a suitable pipe into the second reactor maintained at about 70° C., where phosgene is blown. The reaction is continued until the reaction mass is changed to a light fluid state. Further, the mass is overflowed into the third reactor maintained at 160° C. to complete the reaction. The conversion yield is 96.5%.

*Example 4*

To a reactor cooled at 0° C., a solution consisting of 150 parts of phosgene and 300 parts of dichlorobenzene is added. With being agitated, a solution consisting of 92 parts of benzidine and 1540 parts of dichlorobenzene is added dropwise to the said phosgene solution, while the reactor is so cooled that the inner temperature does not exceed 40° C. Just after the completion of the addition, the temperature is raised to 70° C. Additional amount of phosgene is blown over four hours, whereby the viscous slurry is changed to a light fluid suspension. By heating at 140° C., finally, a clear solution is obtained. The conversion yield is 98%.

*Example 5*

To a reactor as set forth in Example 1, a solution consisting of 112.7 parts of phosgene and 225 parts of dichlorobenzene is added. With being agitated, an amine solution consisting of 47.5 parts of 1,5-naphthylenediamine and 568 parts of dichlorobenzene is dropped thereto over about 30 minutes. During the reaction, the temperature of the reaction mixture is kept at 30° to 35° C. After that time, a dark violet, viscous slurry is formed. Thereafter, the temperature of the mixture is raised up to 60° to 80° C., while gaseous phosgene is blown for about 5 hours thereinto, whereby the viscous slurry is changed to a light fluid suspension. Subsequently, the temperature of the suspension is raised up to 130° to 140° C., while phosgene is blown for 30 minutes, whereby the suspension is changed to a clear solution. An analysis of the solution shows 97.5% of conversion of the amine.

*Example 6*

To a reactor as set forth in Example 1, 44.6 parts of liquefied phosgene is placed. With being agitated, an amine solution consisting of 32.1 parts of p-toluidine and 401 parts of o-dichlorobenzene is dropped thereto over about 30 minutes, during which time the temperature of the reaction mixture rises from 5° C. to 35° C. Then, the temperature of the mixture is raised up to 65° to 75° C., while gaseous phosgene is blown for about 4 hours thereinto, whereby the viscous slurry is changed to a light fluid suspension. Subsequently, the temperature of the suspension is raised to 150° C. and kept at the temperature for 30 minutes, whereby the suspension is changed to a clear reddish brown solution. The analysis shows that 98.5% of the amine is converted to the isocyanate. After distillation, o-tolyl isocyanate of 99.5% purity is obtained with 97% distillation yield.

We claim:

1. A process for producing 2,4-tolylene diisocyanate, 2,6-tolylene diisocyanate, mixtures of 2,4- and 2,6-tolylene diisocyanates, 4,4'-diphenylmethane diisocyanate, 4,4'-biphenyl diisocyanate, 1,5-naphthylene diisocyanate, and tolyl isocyanates, which comprises a step of mixing a solution of a member selected from the group consisting of 2,4-tolylene-diamine, 2,6-tolylenediamine, mixtures of 2,4- and 2,6-tolylenediamines, 4,4'-diaminodiphenylmethane, benzidine, 1,5-naphthylenediamine, and o-, m-, and p-toluidines, in an inert solvent with phosgene in an amount of at least the stoichiometric amount and less than 2 times the stoichiometric amount, based upon the amount of the amine, nearly at below room temperature; a step of introducing phosgene into the resulting reaction mixture at a temperature of 60 to 80 degrees C., for at least four hours, thereby to convert the amine groups to the corresponding aromatic carbamyl chloride substantially completely; and a step of heating the suspension at a higher temperature to cause the decomposition of the aromatic carbamyl chloride to the corresponding aromatic isocyante.

2. A process according to claim 1, wherein phosgene used in the first step is in a solution state in a solvent medium comprising one member selected from the group consisting of toluene, xylene, monochlorobenzene, o-dichlorobenzene, p-dichlorobenzene and trichlorobenzenes.

3. A process for continuously producing 2,4-tolylene diisocyante, 2,6-tolylene diisocyanate, mixtures of 2,4- and 2,6-tolylene diisocyanates, 4,4'-diphenylmethane diisocyanate, 4,4'-biphenyl diisocyanate, 1,5-naphthylene diisocyanate, and tolyl isocyanates, which comprises mixing, in a first reaction zone kept nearly at below room temperature, a member selected from the group consisting of 2,4-tolylenediamine, 2,6-tolylenediamine, mixtures of 2,4- and 2,6-tolylenediamines, 4,4'-diaminodiphenylmethane, benzidine, 1,5-naphthylenediamine, and toluidines, with phosgene in an amount of at least the stoichiometric amount and less than 2 times the stoichiometric amount, based upon the amount of the amine, continuously overflowing the resulting reaction mixture to a second reaction zone kept at a temperature of 60 to 80 degrees C. where phosgene is continuously introduced into the mixture for at least four hours thereby to convert the amine groups to the corresponding aromatic carbamyl chloride substantially completely, and continuously overflowing the suspension to a third reaction zone kept at a higher temperature to cause the decomposition of the aromatic carbamyl chloride to the corresponding aromatic isocyanate.

4. A process according to claim 3, wherein phosgene used in the first reaction zone is in a solution state in a solvent medium comprising one member selected from the group consisting of toluene, xylene, monochlorobenzene, o-dichlorobenzene, p-dichlorobenzene and trichlorobenzenes.

References Cited by the Examiner

UNITED STATES PATENTS 2,643,264    6/53    Fauser _____ 260—453

FOREIGN PATENTS 200,717    1/56    Australia.
789,265    1/58    Great Britain.

CHARLES B. PARKER, *Primary Examiner.*

IRVING MARCUS, *Examiner.*